US007286648B1

(12) United States Patent
Chang et al.

(10) Patent No.: US 7,286,648 B1
(45) Date of Patent: Oct. 23, 2007

(54) EMERGENCY LOCATOR SYSTEM

(75) Inventors: E-Lee Chang, Mableton, GA (US); Sharon E. Carter, Austell, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 149 days.

(21) Appl. No.: 09/965,984

(22) Filed: Sep. 28, 2001

(51) Int. Cl.
*H04M 11/00* (2006.01)

(52) U.S. Cl. .......................................... 379/45; 379/37

(58) Field of Classification Search .................. 379/45, 379/37-41, 51; 455/404, 456; 340/438, 340/436, 531, 539
See application file for complete search history.

(56) References Cited

U.S. PATENT DOCUMENTS

| | | | | |
|---|---|---|---|---|
| 5,195,126 | A * | 3/1993 | Carrier et al. | 379/45 |
| 5,388,147 | A * | 2/1995 | Grimes | 379/45 |
| 5,389,934 | A * | 2/1995 | Kass | 342/357.07 |
| 5,625,668 | A * | 4/1997 | Loomis et al. | 455/456.5 |
| 5,652,570 | A * | 7/1997 | Lepkofker | 379/38 |
| 5,701,301 | A | 12/1997 | Weisser, Jr. | 370/428 |
| 5,742,233 | A * | 4/1998 | Hoffman et al. | 379/38 |
| 5,742,666 | A * | 4/1998 | Alpert | 379/40 |
| 5,805,670 | A * | 9/1998 | Pons et al. | 379/45 |
| 5,835,907 | A * | 11/1998 | Newman | 379/37 |
| 5,838,237 | A * | 11/1998 | Revell et al. | 340/573.1 |
| 5,864,755 | A * | 1/1999 | King et al. | 379/37 |
| 6,167,435 | A * | 12/2000 | Druckenmiller et al. | 709/206 |
| 6,201,856 | B1 * | 3/2001 | Orwick et al. | 379/45 |
| 6,226,510 | B1 * | 5/2001 | Boling et al. | 455/404 |
| 6,295,346 | B1 * | 9/2001 | Markowitz et al. | 379/45 |
| 6,340,928 | B1 * | 1/2002 | McCurdy | 340/436 |
| 6,442,241 | B1 * | 8/2002 | Tsumpes | 379/45 |
| 6,509,868 | B2 * | 1/2003 | Flick | 340/467 |
| 6,674,840 | B1 * | 1/2004 | Contractor | 379/201.12 |
| 6,775,356 | B2 * | 8/2004 | Salvucci et al. | 379/45 |
| 2004/0247086 | A1 * | 12/2004 | Menard et al. | 379/45 |

* cited by examiner

*Primary Examiner*—Stella Woo
(74) *Attorney, Agent, or Firm*—Lee & Hayes, PLLC

(57) ABSTRACT

Systems and methods for providing distributed notification of an emergency event are disclosed. A system according to the invention can include a remote device that is communicatively coupled to a base station. The remote device can include an activation device, a GPS signal receiver, a remote device controller, and a location signal transmitter. The GPS signal receiver is adapted to receive global positioning signals from each of a plurality of global positioning satellites. The transmitter is adapted to transmit location signals to the base station. The base station can include a contact profile data store, a location signal receiver, a base station controller, and a notification signal transmitter. The location signal receiver is adapted to receive location signals from the remote device. The notification signal transmitter is adapted to transmit notification signals to each of a plurality of contacts, which can include an emergency service.

41 Claims, 5 Drawing Sheets

300

| Remote Device Identifier (304) | Subscriber Identifier (306) | Contact List (308) | Contact Address (310) | Contact Type (312) |
|---|---|---|---|---|
| 1-234-567-8900 | Subscriber 1 | Emergency<br>Spouse<br>Mother | 911<br>1-234-345-5678<br>1-234-356-8796 | voice<br>voice<br>voice |
| 1-234-678-9012 | Subscriber 2 | Spouse email<br>Spouse Work<br>Spouse Mobile | spouse@work<br>1-800-555-5637<br>1-234-654-7654 | text<br>voice<br>voice |
| 1-456-789-0123 | Subscriber 3 | Emergency<br>Office email | 911<br>help@myoffice | voice<br>text |
| 1-234-432-1010 | Subscriber N | Emergency<br>Sibling's pager | 911<br>1-800-555-3443 | voice<br>text |

302

FIG. 3

EMERGENCY LOCATOR SYSTEM

FIELD OF THE INVENTION

This invention relates to the field of telecommunications. More particularly, the invention relates to systems and methods for concurrent notification of a user-provided list of emergency contacts.

BACKGROUND OF THE INVENTION

Unfortunately, individuals sometimes find themselves in situations in which they need assistance. For example, an individual might suffer a sudden heart attack, or an unexpected traffic problem, such as a vehicle breakdown or accident, or there might be an intruder in the house, or someone suspicious approaching, or the like. In such situations, the individual could call a predefined emergency telephone number, such as 911, to notify authorities and request such emergency services as police, ambulance, fire, towing, or the like. Alternatively or additionally, the individual could call one or more family members, friends, or other contacts to notify them of the situation as well.

In an emergency, however, individuals typically cannot afford the time to make a number of phone calls to notify various others that the situation exists. For example, if an individual is having a heart attack, he would not likely want to make more than one phone call, nor would he likely be able to do so. If an intruder were in the house, the individual would want to focus on getting out of the house, rather than making a number of calls.

There are also emergency situations in which the individual cannot actually dial a phone. For example, if the individual has suffered a heart attack, he might not be able to dial the number, or be lucid enough, while in pain, even to remember the number to dial. Similarly, if the individual is being robbed at gunpoint, the robber is unlikely to allow the victim to make a phone call. If an intruder were in the house or a suspicious person approaching, the individual would likely not want to be heard while calling for help.

Hence, there is a need in the art for systems and methods by which an individual in need of emergency assistance can notify a plurality of contacts by initiating a single communication. There is especially a need for such systems and methods wherein such notification can be triggered without requiring the individual to dial a phone or to speak.

BRIEF SUMMARY OF THE INVENTION

The invention satisfies the aforementioned needs in the art by providing systems and methods for providing distributed notification. The invention allows people in an emergency situation to provide notification and location information of an emergency event. People who are in danger can activate a device, which can trigger a notification to the appropriate emergency service for that area, as well as to the telephone numbers, pager numbers, email addresses, etc., of a predefined list of emergency contacts.

An emergency services operator, such as a 911 operator, for example, who receives the notification signal can quickly pinpoint the location of the person in trouble by using location information contained in the signal provided by the device. Preferably, the device includes a Global Positioning System (GPS) receiver for this purpose. The list of emergency contacts would receive a message (such as a voice or text message, for example), which would provide access to more information regarding the emergency (such as status and location, for example). Voice portal technology could be used to provide additional, up-to-date information about the emergency. This service can be activated using a special beeper, car-mounted device, or jewelry-type transceiver device that contains an emergency activation button.

BRIEF DESCRIPTION OF THE SEVERAL VIEWS OF THE DRAWING

Other features of the invention are further apparent from the following detailed description of the embodiments of the present invention taken in conjunction with the accompanying drawing, of which:

FIG. 3 depicts exemplary contents of a contact profile data store according to the invention.

DETAILED DESCRIPTION OF THE INVENTION

Referring now to the figures, an embodiment of the systems and methods of the invention will be described. Basic telephony concepts and terminology are used throughout the description as would be understood by one of skill in the art.

Figure 1:
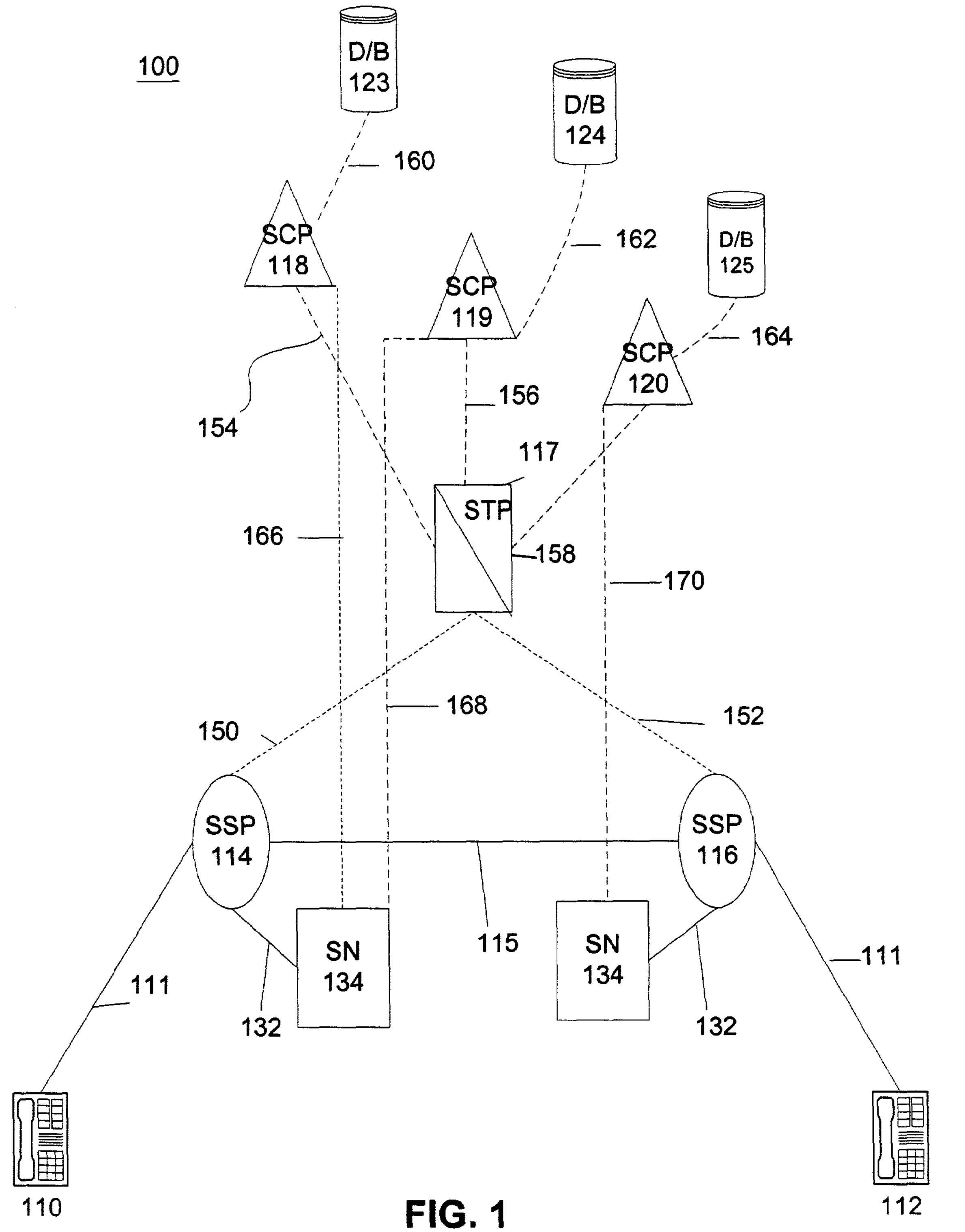
FIG. 1 is a block diagram of an exemplary telecommunications network in which the principles of the invention can be employed.

FIG. 1 is a block diagram of an exemplary telecommunication network 100, such as a public switched telecommunications network (PSTN), in which the principles of the invention can be employed. More particularly, FIG. 1 illustrates a simplified advanced intelligent network (AIN). AIN systems are described in U.S. Pat. No. 5,701,301, the disclosure of which is hereby incorporated herein by reference. Though the various features and aspects of the invention can be utilized in conjunction with an AIN, it should be understood that the invention is not limited to AIN-based systems, and that other networks and system arrangements can be used in accordance with the invention.

As shown, the AIN 100 can include a plurality of service switching points (SSPs) 114, 116. SSPs 114, 116 are capable of generating AIN queries. An SSP, which is also known as a "central office," is basically a switch and the terms are used interchangeably herein. SSPs 114 and 116 can comprise, for example, DMS100 or 5ESS switches. These switches can be manufactured by, for example, Lucent Technologies, Inc. or Nortel Networks.

Each of the SSPs 114, 116 can have one or more subscriber lines 111 connected thereto. Subscriber lines 111 may also be referred to as calling lines. Each SSP 114, 116 serves a designated group of calling lines 111, and thus, the SSP that serves a particular calling line may be referred to as its serving switch. Typically, each calling line 111 is connected to one or more pieces of terminating equipment 110, 112, such as a telephones, facsimile machines, computers, modems, or other such telecommunication devices.

SSPs 114, 116 are interconnected by one or more trunk circuits 115. Trunks 115 are basically the voice paths via which communications are connected between SSPs. The term "communication" or "call" is used herein to include all messages that may be exchanged between the calling party and the called party in a telecommunication network, such as illustrated in FIG. 1. Trunk 115 can be either a Signaling System 7 (SS7) controlled multi-frequency (MF) trunk, or primary rate interface (PRI) trunk or the like. The type of trunk will be in accordance with both the sending and receiving SSP to which it is connected.

Each SSP 114, 116 can include different types of facilities and/or triggers. SSPs 114 and 116 are programmable switches that can perform some or all of the following functions: recognize AIN-type calls, launch queries, and receive commands and data to further process and route AIN-type calls. When one of SSPs 114 or 116 is triggered by an AIN-type call, the triggered SSP 114 or 116 formulates and sends an AIN query. Based on the reply from the AIN network, SSP 114 or 116 responds to call processing instructions received.

Each of SSPs 114 and 116 is connected to a signal transfer point (STP) 117 via respective data links 150, 152. Data links 150, 152 can employ SS7, for example, though it should be understood that any suitable signaling protocol could be employed. To facilitate signaling and data messaging, each SSP 114 and 116 can be equipped with Common Channel Signaling (CCS) capabilities, e.g., SS7, which provides two-way communications of data messages over CCS links 150 and 152 between components of the AIN network. The data messages can be formatted in accordance with the Transaction Capabilities Applications Part (TCAP). Alternatively, Integrated Service Digital Network (ISDN) Users Part (ISUP) can be used for signaling purposes between, for example, SSPs 114 and 116. In such a case, SSPs 114 and 116 can be equipped with the capability to map appropriate data between TCAP and ISUP protocols, and vice versa. The telephone network basically employs an upper-level software controlled network through the STPs and the SCP.

SSPs 114 and 116 may allow normal switch processing to be suspended at specific points in a call so that the switch can send an AIN message query via signaling transfer point (STP) 117 to SCP 118, 119 or 120. SCP 118, 119 or 120 may execute software based service logic and return call-processing instructions to the triggering AIN SSP. New services may be provisioned by assigning AIN SSP triggers to customer lines, trunks, and/or NANP (North American Numbering Plan) telephone numbers.

Much of the intelligence of the AIN resides in a type of AIN element referred to as a service control point (SCP) 118, 119, 120 that is connected to STP 117 over an SS7 data link, or the like, 154, 156 or 158. Accordingly, the connections by links 150, 152, 154, 156, and 158 are for signaling purposes and allow SSPs 114 and 116 to send messages to, and receive messages from, SCP 118, 119 and 120.

Among the functions performed by SCP 118, 119, 120 is the hosting of network databases and subscriber databases, which may be stored in respective data storage objects 123, 124, 125. For example, data storage object 123 is shown as a database communicatively coupled to SCP 118, although data storage object 123 can be embodied as a component within SCP 118, such as an internally-mounted hard disk device. The databases stored in data storage object 123 may be used in providing telecommunications services to a customer. Typically, SCP 118, 119, 120 is also the repository of service package applications (SPAs) that are used in the application of telecommunication services, enhanced features, or subscriber services to calling lines. Additionally, SPAs may use databases for providing telecommunication services.

A set of triggers can be defined at the SSPs 114, 116. A trigger in the AIN is an event associated with a particular call that initiates a query to be sent to SCP 118, 119, or 120. The trigger causes selected SCP 118, 119, or 120 to access, if necessary, its respective database 123, 124, or 125 for processing instructions with respect to the particular call. The results of the SCP processing and/or database inquiry is/are sent back to selected SSP 114 or 116 in a response through STP 117. The return packet includes instructions to SSP 114, 116 as to how to process the call. The instructions may be to take some special action as a result of a customized calling service, enhanced feature, or subscriber service. In response, switch 114, 116 moves through its call states, collects the called digits, and generates further packets that are used to set up and route calls. Similar devices for routing calls among various local exchange carriers are provided by regional STP and regional SCP.

An example of such a trigger is a termination attempt trigger (TAT), which causes a query to be sent to SCP 118, 119, or 120 whenever an attempt is made to terminate a call on the line of subscriber 110 or 112. Another type of trigger that may be used is a Public Office Dialing Plan (PODP) trigger, though it should be understood that the principles of the invention include the use of other triggers.

The AIN can also include a services circuit node 134 (SCN), which may also be referred to herein as a services node (SN). SN 134 is an interactive data system that acts as a switch to transfer calls. SN 134 may provide interactive help, collect voice information from participants in a call, and/or provide notification functions. SN 134 can be a Lucent Technologies Star Server FT Model 3200 or Model 3300 although other such devices can be employed. SN 134 can include voice and dual tone multi-frequency (DTMF) signal recognition devices and/or voice synthesis devices. In addition, SN 134 can include a data assembly interface. SN 134 can be connected to local SCP 118, 119, 120 via respective data links 166, 168, 170 using an X.25, SS7 or TCP/IP protocol or any other suitable protocol. In addition, SN 134 typically may be connected to one or more (but usually only a few) SSPs via Integrated Service Digital Network (ISDN) lines or any other kind of suitable telephone lines 132.

One skilled in the art will further recognize that the above-described network is a simplified network meant for explanatory purposes. It is likely that a telephone network might include numerous user stations, SSPs, STPs, SCPs, and SNs along with other telephone network elements, and can employ other types of triggers without departing from the spirit and scope of the invention.

Figure 2:
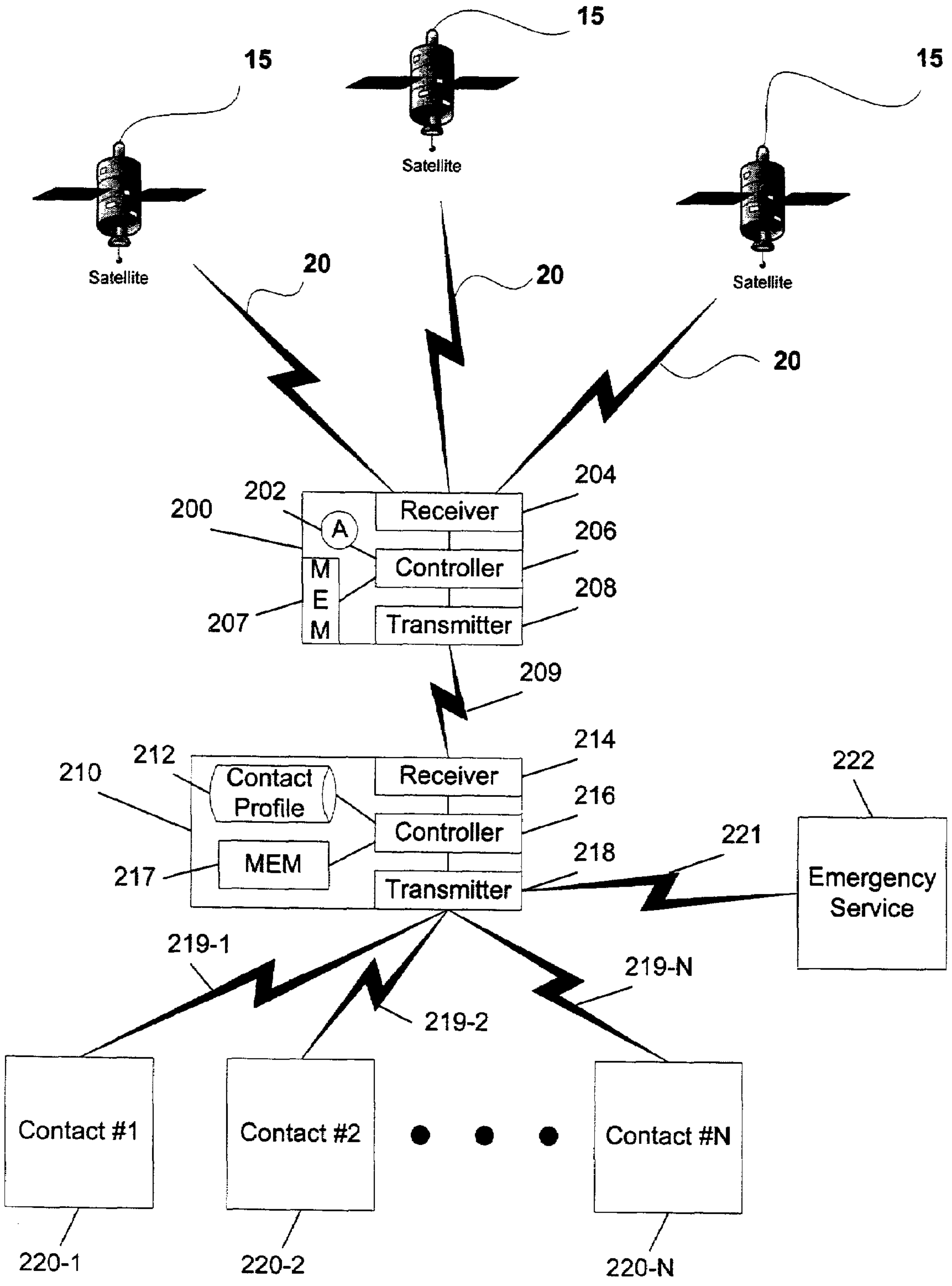
FIG. 2 is a block diagram of a preferred embodiment of an emergency locator system according to the invention.

FIG. 2 is a block diagram of a preferred embodiment of a system according to the invention for providing distributed notification. As shown, a system according to the invention can include a remote device 200, which is preferably a small, hand-held device, having a form factor of a pager, for example. The remote device 200 is communicatively coupled to a base station 210 via a communications link 209. Preferably, the communications link 209 is a wireless, radio-frequency (RF) communications link.

The remote device 200 can include an activation device 202, a GPS signal receiver 204, a remote device controller 206, and a location signal transmitter 208. The GPS signal receiver 204 is adapted to receive global positioning signals from each of a plurality of global positioning satellites 15 via respective GPS links 20. Preferably, the GPS signal receiver 204 includes a GPS antenna (not shown) for receiving the global positioning signals from the GPS satellites. The transmitter 208 is adapted to transmit location signals via a communication link 209 to a base station 210.

The activation device 202 is electrically connected to the remote device controller 206. The activation device 202 can be a button that sends an electrical impulse to the remote device controller 206 when the button is pushed. Preferably, to reduce the incidence of accidental triggering (and, consequently, the incidence of false alarms), the button can be depressed into a housing of the remote device, covered with a cap, or otherwise disposed so as to minimize inadvertent activation of the device.

Alternatively, the activation device 202 can be coupled to another event trigger, such as a collision sensor in an automobile, for example, such as would be used to detect a collision for purposes of airbag deployment. When the collision sensor detects that the automobile has been involved in a collision, the collision sensor transmits a signal, such as an electrical impulse, to the activation sensor 202, which, in turn, transmits an electrical impulse to the remote device controller 206. Alternatively, the collision sensor and the activation sensor 202 can be one in the same. That is, the collision sensor can be electrically connected directly to the remote device controller 206 and transmit an electrical signal to the remote device controller 206 upon detection that the automobile has been involved in a collision. In such an embodiment, the device can be integrated into an automobile.

Preferably, the remote device controller 206 includes a microprocessor that contains computer executable instructions for controlling the operation of the remote device 200 for performing a method according to the invention as will be described in detail below. Preferably, the remote device 200 includes a memory 207 for storing a remote device identifier, such as a serial number, that uniquely identifies the remote device 200. The remote device can also include a power supply (not shown), such as a watch battery, and a clocking source (not shown).

The base station 210 can include a contact profile data store 212, a location signal receiver 214, a base station controller 216, and a notification signal transmitter 218.

The location signal receiver 214 is adapted to receive location signals via the communications link 209 from the remote device 200. The notification signal transmitter 218 is adapted to transmit notification signals to each of a plurality of contacts 220-1, 220-2, . . . , 220-N via respective communication links 219-1, 219-2, . . . , 219-N. Preferably, the notification signal transmitter 218 is further adapted to transmit notification signals to an emergency service 222 via a corresponding communications link 221. Generally, the emergency service can be thought of as an additional ($N+1^{st}$) contact.

Preferably, the base station controller 216 includes a microprocessor that contains computer executable instructions for controlling the operation of the base station 210 and for performing a method according to the invention as will be described in detail below. Preferably, the base station 210 includes a memory 217 for storing voice and text notification templates as will be described in detail below.

FIG. 3 depicts exemplary contents 300 of a contact profile data store in accordance with the invention. As shown, the contact profile data store can contain a plurality of entries or contact profiles 302. Each contact profile 302 is associated with a remote device identifier 304 such as described above in connection with FIG. 2. Each remote device identifier is associated with a respective subscriber identifier 306 and contact list 308. The subscriber identifier 306 can include the name of the person who is registered as the owner of the remote device, or any other data that can be used to associate the remote device with a person. Each contact list 308 includes one or more contacts. Each contact is associated with a respective contact address 310 and contact type 312.

The contact address 310 is an address at which the contact is to be notified, i.e., an address to which the base station should send a notification signal at the occurrence of a triggering event. Examples of contact addresses 310 include telephone numbers, pager numbers, fax numbers, or email addresses.

The contact type 312 represents the type of notification that should be provided to the contact at the occurrence of a triggering event. Examples of contact types 312 include voice or text. Preferably, the base station provides voice notification signals to 26 the contact where the contact address is a telephone number, and text notification signals where the contact address is a pager number, fax number, or email address.

Preferably, the subscriber provides the data for the associated contact profile 302. Preferably, the subscriber can setup the contacts list initially via a Web site provided by the provider of the emergency locator service. The subscriber logs on to the Web site using his subscriber ID and a prearranged password. The password can be set initially by the provider of the emergency locator service, with an option for the subscriber to change the password if he so desires.

The subscriber can then provide the list of contacts and a contact address for each contact in the list. The server on which the Web site resides (the Web server) can provide the subscriber with options to indicate whether the address corresponds to a telephone, pager, fax machine, email address or the like. In this way, the server can determine whether the contact type is voice or text. Similarly, the subscriber can add, delete, or modify data in the subscriber's entry in the contact profile data store. Preferably, the Web server is coupled to the base station such that the Web server can update the contact profile data store to reflect the subscriber's input. Alternatively, the base station can be implemented on a server that provides the Web site, or other user interface that the subscriber can access remotely by computer or telephone, for example.

Preferably, the server tests and validates the contact addresses that the subscriber provides to ensure that the contact addresses are valid, working addresses. For example, if the subscriber provides an email address, the server can send a test email message to the address. If the message is not returned as undeliverable, then the server determines that the email address is a valid address, and stores the address in the subscriber's contacts list. Similarly, if the subscriber provides a telephone number, fax number, pager number, or the like, the server can initiate a test call to the number provided to determine whether the number is valid and active. If so, the server updates the contacts list to include the subscriber-provided contact address.

Figure 4A:
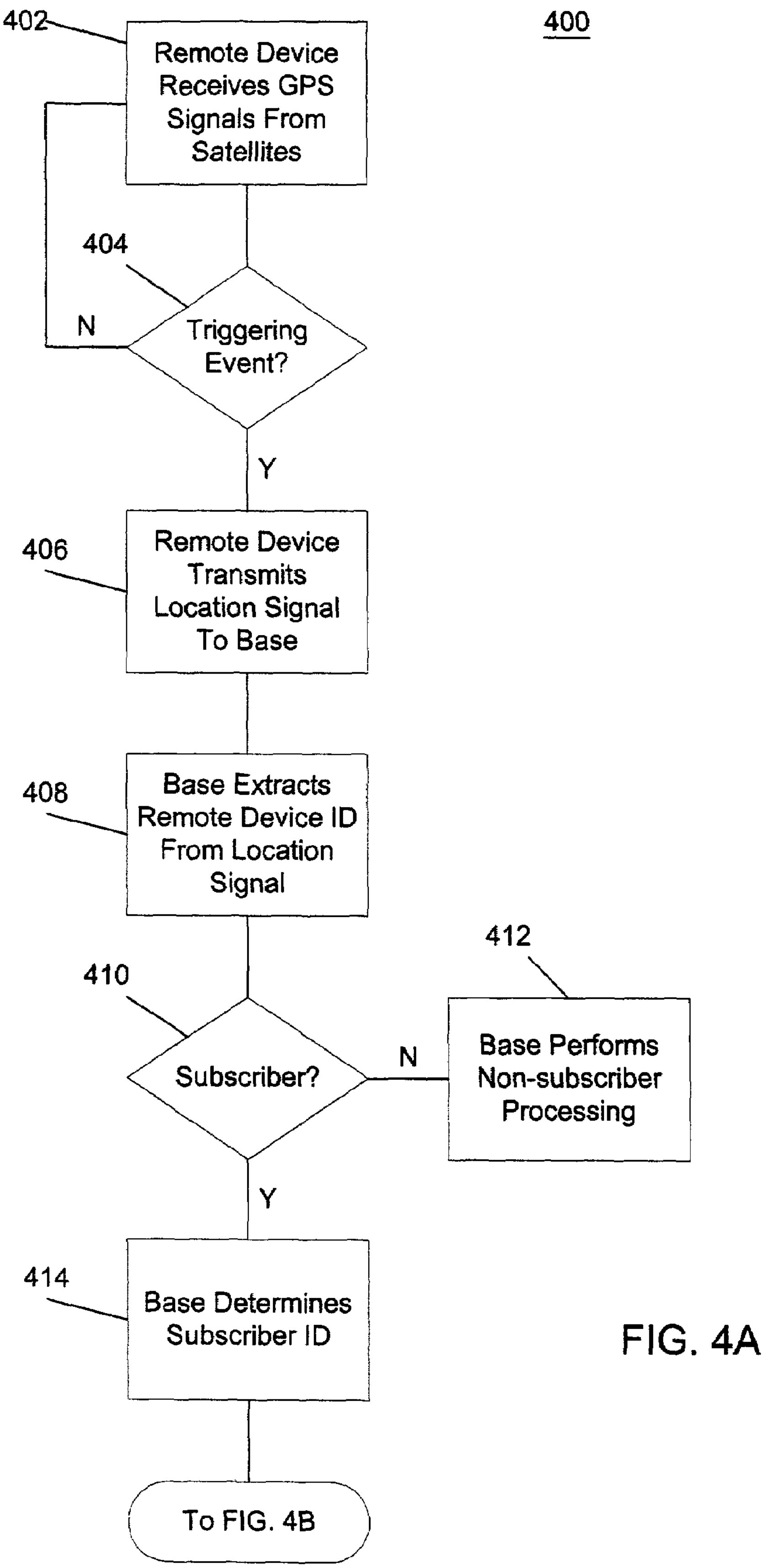
FIGS. 4A and 4B provide a flowchart of a preferred embodiment of a method according to the invention for concurrent notification of a predefined list of emergency contacts.
Figure 4B:
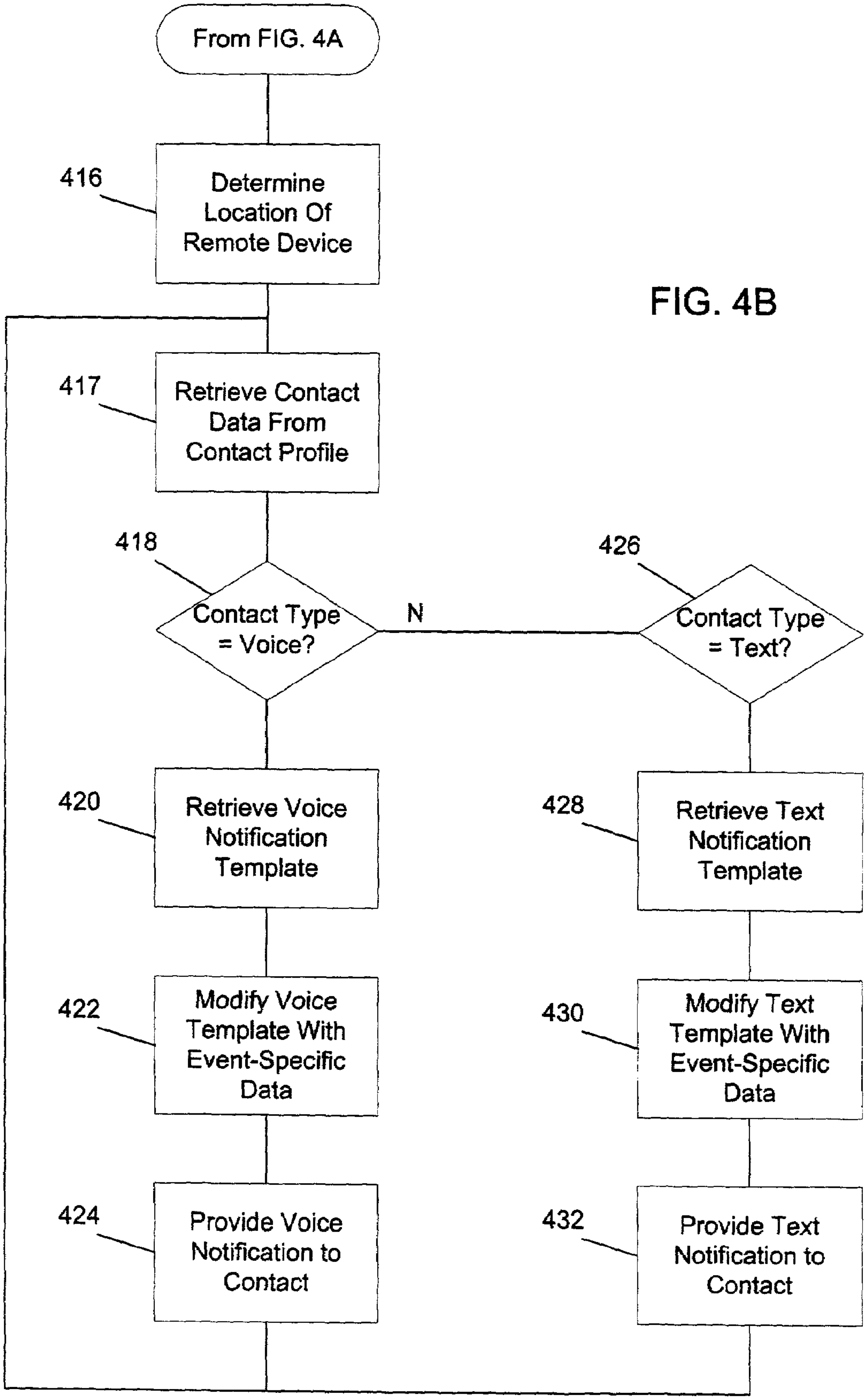

FIGS. 4A and 4B provide a flowchart of a method 400 according to the invention for providing distributed notification. At step 402, the remote device receives global positioning signals from a plurality of GPS satellites. As described above in connection with FIG. 2, the remote device can include a GPS receiver that is adapted to receive the global positioning signals. The remote device can receive GPS signals continuously or, more preferably, to reduce power consumption, the remote device receives signals only after a triggering event has been detected. In such an embodiment, the remote device controller initiates ("turns on") the GPS receiver or otherwise causes the GPS receiver to receive the GPS signals upon detection of the occurrence of a triggering event. The GPS receiver passes the received GPS signals to the remote device controller.

At step 404, the remote device detects the occurrence of a triggering event. In an embodiment wherein the remote device includes an activation button, a triggering event occurs when the activation button is pushed. In such an embodiment, the remote device controller detects the electrical impulse from the button and thereby recognizes that a triggering event has occurred. In an alternate embodiment wherein the activation sensor is coupled to an automobile's collision sensor, for example, a triggering event occurs when the collision sensor detects that the automobile has been involved in an accident. In such an embodiment, the remote device controller detects the electrical signal from the collision sensor (via the activation sensor if the activation sensor is separate form the collision sensor) and thereby recognizes that a triggering event has occurred.

Upon detection of the occurrence of a triggering event at step 404, the remote device, at step 406, transmits a location signal to the base station. The remote device controller forms a location signal data packet, and passes the location signal data packet to the transmitter. The remote device transmitter transmits the location signal data packet as a location signal to the base station. Preferably, the location signal includes the remote device identifier, which the remote device controller retrieves from the memory in the remote device, and a representation of the location of the remote device. To reduce the processing requirements of the remote device, the location signal preferably contains the raw GPS data that is downloaded from the GPS satellites. Alternatively, the location signal can contain a longitude and latitude of the remote device. In such an embodiment, the remote device controller is programmed to compute the longitude and latitude from the raw GPS data.

At step 408, the base station receives the location signal via the base station receiver. The base station receiver passes the location signal data packet to the base station controller, which extracts the remote device identifier from the location signal data packet. At step 410, the base station controller determines whether the remote device belongs to a subscriber to the emergency locator service. That is, the base station controller determines whether the remote device identifier extracted from the location signal corresponds to a remote device identifier in the contact profile data store. The remote device identifier might not be in the contact profile data store because the subscriber's subscription to the emergency location service might not have been activated or might have lapsed, for example.

If, at step 410, the base station controller determines that the remote device identifier extracted from the location signal does not correspond to a remote device in the contact profile data store, then, at step 412, the base station controller performs non-subscriber processing. Non-subscriber processing can be, for example, ignoring the call, or notifying an emergency service that an emergency has been detected at the location of the remote device, even though the identity of the subscriber cannot be provided to the emergency service, nor can any additional contacts be notified.

If, at step 410, the base station controller determines that the remote device identifier extracted from the location signal does correspond to a remote device in the contact profile data store, then, at step 414, the base station controller determines the corresponding subscriber ID. Preferably, the base station controller retrieves the subscriber ID from the contact profile associated with the remote device ID. Alternatively, the base station controller can extract the subscriber ID from the location signal. In such an embodiment, the remote device stores the subscriber ID in memory. The remote device controller retrieves the subscriber ID from memory and includes the subscriber ID in the location signal.

At step 416, the base station controller determines the location of the remote device (and, consequently, of the subscriber in the emergency situation). Preferably, where the location signal includes raw global positioning data, the base station controller computes a longitude and latitude from the raw global positioning data using well-known techniques. Thus, the base station controller computes a longitude and latitude that correspond to the location of the remote device. Alternatively, the remote device controller can compute the longitude and latitude of the remote device from the raw GPS data, and provide the longitude and latitude to the base station in the location signal.

Preferably, the base station converts the raw GPS data (or the longitude and latitude) into a street address. The base station can include a data store that contains a mapping of longitude/latitude into street address. Alternatively, the base station can access such a data store via a network, such as the Internet. Alternatively, the base station can access a remote processor via such a network, provide the longitude/latitude data to the remote processor, and receive a corresponding street address from the remote processor.

At step 417, the base station controller retrieves from the contact profile data store the contact data associated with the remote device identifier. For each of the contacts in the contact list, the base station controller determines whether the contact type is voice or text. If, at step 418, the base station controller determines that the contact type is voice, then, at step 420, the base station controller retrieves a voice notification template from memory. At step 422, the base station controller modifies the voice notification template with event specific data to form a voice notification file.

For example, a voice notification template can be an audio or text file that corresponds to the message "An emergency involving [subscriber ID] has been reported at [location of remote device]. Emergency services [have/have not] been contacted. Please contact us for more information." At the occurrence of a triggering event, the base station controller can modify the voice notification template by interleaving audio or text corresponding to the subscriber ID and location into the voice notification template to form the voice notification file. Depending on whether the contacts list includes an emergency service, the voice notification file is modified accordingly. If either or both of the voice notification template and voice notification file are to be stored as audio, then existing text-to-speech technology can be employed to convert text to audio before it is stored.

At step 424, the base station controller provides a voice notification signal to the contact address via the base station transmitter. For example, where the contact address is a telephone number, the base station controller initiates a telephone call to the contact address. In an embodiment wherein the base station is implemented within a service node, the communications link between the base station and a contact having a telephone number as a contact address can include one or more SSPs, trunks, calling lines, and the like as described in FIG. 1. If the voice notification file is stored as an audio file, then the base station controller causes the audio file to be played over the communications link to the contact when the base station controller detects that the call has been answered. If the voice notification file is stored as text, then text-to-speech technology is employed to convert the text file into audio, which is then played over the communications link to the contact.

If, at step 426, the base station controller determines that the contact type is text, then, at step 428, the base station controller retrieves a text notification template from memory. At step 430, the base station controller modifies the text notification template with event specific data to form a text notification file.

For example, a text notification template can be a text file that corresponds to the message "An emergency involving [subscriber ID] has been reported at [location of remote device]. Emergency services [have/have not] been contacted. Please contact us for more information." At the occurrence of a triggering event, the base station controller can modify the text notification template by interleaving text corresponding to the subscriber ID and location into the text notification template to form the text notification file. Depending on whether the contacts list includes an emergency service, the text notification file is modified accordingly.

At step 432, the base station controller provides a text notification signal to the contact address via the base station transmitter. For example, where the contact address is a pager number, the base station controller initiates a call to the contact address. When the controller detects that the call has been answered, the controller provides the text notification to the contact's pager. Similarly, where the contact address is a fax number, the base station controller initiates a call to the contact address and, when the controller detects that the call has been answered, the controller provides the text notification to the contact's fax machine. In an embodiment wherein the base station is implemented within a service node, the communications link between the base station and a contact having a pager number or fax number as a contact address can include one or more SSPs, trunks, calling lines, and the like as described in FIG. 1.

Where the contact address is an email address, the base station controller sends to the contact address, via a network such as the Internet, an email that includes the text notification. The communications link between the base station and a contact having an email address as a contact address can be part of a wide area network, such as the Internet, for example. Accordingly, the base station can include a network access program, such as a Web browser, for example, that enables the base station to connect to the network.

The process continues at step 417 until all the contacts in the list have been notified.

It is anticipated that a subscriber might inadvertently activate a remote device, thereby causing a false alarm to be sent to the contacts on that subscriber's contacts list. This might occur, for example, where the subscriber accidentally pushes the activation button on the remote device. Another example of a false alarm can occur where a subscriber at first perceives a situation as an emergency, but later determines that the situation is harmless. Sometimes, even when the emergency situation is real, the situation is resolved within a short period of time. For example, the parties to a minor traffic accident might agree that any damage is minimal, and that they will go their separate ways. In such a situation, the subscriber might wish to rescind the call to the emergency contacts. At other times, the nature of the emergency might require that the subscriber be moved from the location, such as when the victim of an automobile accident needs to be taken to a hospital. In each of these examples, and in others, the contacts could arrive at the location of the emergency event only to find that the subscriber is not in danger or is no longer there.

To reduce the incidence of false alarms and the likelihood that a contact will arrive at a location after the situation has been resolved or the subscriber has already left, a system according to the invention can provide up-to-date information about the location of the remote device or the status of the emergency situation. Rather than treating the emergency as an isolated event that occurs when the remote device is activated, to provide up-to-date information, the emergency locator system can treat the emergency as an ongoing situation that begins when the remote device is activated. The system considers the emergency situation to be "ongoing" from the time the remote device is activated, until either the subscriber "terminates" the event, or a predefined timeout period expires.

While the situation is ongoing, the remote device can continually or periodically send location information to the base station. Alternatively, the base station can periodically interrogate the remote device by sending a location request signal to the remote device from time to time. In response to receiving the location request signal, the remote device can provide the base station with its current location. In a manner as described above, the base station can maintain the current location of the remote device (which, presumably, is the current location of the subscriber).

Preferably, the system provides emergency contacts with access to current location information via a network connection, such as by using a telephone or Internet appliance. That is, the contact can retrieve up-to-date information from the base station server by establishing an Internet connection to a Web site that the provider offers. Alternatively, where voice portal technology is available for mapping information provided on a Web site into intelligible speech, the emergency contact can retrieve the location information from the web site by telephone. In still another embodiment, the emergency contact can place a call to a live operator who retrieves the current information from the server and relays it to the contact. The provider of the emergency locator service can provide the contacts with an address, such as a web site address or telephone number, via the notification signal.

To maintain security in such a system, the emergency contact is preferably required to provide contact identification information, such as the contact id and a prearranged password. Preferably, the subscriber provides the contact id at the time the subscriber sets up the contacts list. The system can provide an initial password for each contact, and the contact can change the password during subsequent use of the system.

When the situation has been resolved, or if the alarm was false, the subscriber can contact the emergency locator service (by telephone, email, or a website, for example), to notify the service that the situation is "over." If the subscriber does not make such a contact within a predefined timeout period, the system treats the situation as if it is over. That is, in either event, the system no longer tracks the location of the remote device, and, therefore, no longer provides updated location information to the emergency contacts. Preferably, the timeout period is defined to be long enough to accommodate most emergency situations (e.g., one hour).

The emergency service or the subscriber can also provide updated status information to the system so that other emergency contacts can retrieve up-to-date status. For example, in the case of a minor traffic accident, the emergency service or subscriber could contact the emergency locator service to advise that everyone at the scene is uninjured. On the other hand, if the accident were severe, the emergency service (or the subscriber, if able) could notify the emergency locator service that individuals have been injured and taken (or will be taken) to a specific hospital for example. The emergency contacts can then retrieve this updated status information in the same manner as described above in connection with retrieval of updated location information.

Thus, there have been described systems and methods for providing distributed notification. Those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

What is claimed is:

1. A method for providing distributed notification, the method comprising:

receiving a location signal at a base station from a remote device associated with a subscriber, the location signal containing data relating to a location of the device;

determining from the location signal a street address associated with the location of the device;

storing a contact profile that includes respective contact data associated with each of a plurality of contacts associated with the remote device;

testing the contact data associated with each of the plurality of contacts, to validate that the contact data for each is valid, the testing comprising initiating a test call to each of the contacts;

providing to each of the plurality of contacts and to an emergency service, from the base station, a respective notification message that contains identification data corresponding to an identity of the subscriber and the street address associated with the location of the device;

obtaining an updated notification message from the remote device, wherein the updated notification message reflects a current location of the device; and providing the updated notification message to each of the plurality of contacts and to the emergency service until a deactivation event occurs.

2. The method of claim 1, wherein receiving the location signal from the remote device comprises receiving a location signal that contains global positioning data relating to the location of the device.

3. The method of claim 2, further comprising: determining from the location signal a longitude and a latitude relating to the location of the remote device.

4. The method of claim 1, wherein receiving the location signal from the remote device comprises receiving a location signal that contains a longitude and a latitude relating to the location of the remote device.

5. The method of claim 1, wherein providing the notification message comprises providing a text notification message to at least one of the contacts.

6. The method of claim 5, wherein providing the text notification message comprises providing a text notification message based on a text notification template.

7. The method of claim 6, further comprising:

storing the text notification template; and modifying the text notification template with event-specific data to form the text notification message.

8. The method of claim 1, wherein providing the notification message comprises providing a voice notification message to at least one of the contacts.

9. The method of claim 8, wherein providing the voice notification message comprises providing a voice notification message based on a voice notification template.

10. The method of claim 9, further comprising:

storing the voice notification template; and modifying the voice notification template with event-specific data to form the voice notification message.

11. The method of claim 1, further comprising: determining the identity of the subscriber associated with the remote device.

12. The method of claim 11, wherein determining the identity of the subscriber comprises retrieving the identity of the subscriber from the contact profile.

13. The method of claim 1, further comprising: recognizing the occurrence of a triggering event; and providing the respective notification messages to each of the plurality of contacts based on the recognition of the occurrence of the triggering event.

14. The method of claim 13, wherein the triggering event is the pushing of an activation button.

15. The method of claim 13, wherein the triggering event is the detection of an automobile collision.

16. The method of claim 1, wherein providing the notification message comprises providing a notification message that contains a status of the event.

17. The method of claim 16, wherein the status of the event comprises one of (i) an indication that everyone at the location is uninjured, and (ii) an indication that individuals at the location have been injured.

18. The method of claim 17, wherein when the status of the event includes an indication that individuals at the location have been injured, the status further including an indication of a hospital to which the injured individuals have been or will be taken.

19. The method of claim 1, wherein determining the street address associated with the location of the device comprises accessing a mapping data store that contains a mapping of longitude/latitude into street address.

20. The method of claim 19, wherein accessing the mapping data store comprises accessing the mapping data store via a network.

21. The method of claim 20, wherein accessing the mapping data store comprises accessing a remote processor via the network, providing longitude/latitude data to the remote processor, and receiving a corresponding street address from the remote processor.

22. The method of claim 1, wherein obtaining an updated notification message from the remote device comprises one of (i) sending an updated location signal at the base station from the remote device and (ii) sending a location request signal to the remote device from the base station.

23. The method of claim 1, wherein the deactivation event is an expiration of a predefined timeout period.

24. The method of claim 1, wherein the deactivation event is a termination by the subscriber.

25. The method of claim 1, further comprising providing a website by which the plurality of contacts can retrieve location information via a network connection.

26. A system for providing emergency notification, the system comprising:

a signal receiver at a base station for receiving location signals that represent a current location of a GPS receiver;

a contact profile data store that contains a contact profile that is associated with a remote device identifier and includes respective contact data relating to each of a plurality of contacts;

a contact validation device that tests the contact data associated with each of the plurality of contacts to validate that the contact data for each is valid, the testing comprising at least one of sending a test message and initiating a test call to each of the contacts; and a signal transmitter at the base station that (i) provides to each of the plurality of contacts and to an emergency service a respective notification message that contains a street address determined from the location signals, the street address corresponding to a location of a remote device associated with the remote device identifier; (ii) obtains an updated notification message from the remote device, wherein the updated notification message reflects a current location of the device; (iii) and provides the updated notification message to each of the plurality of contacts and to the emergency service until a deactivation event occurs, the updated notification message further including up-to-date event status information.

27. The system of claim 26, wherein the contact profile data store further contains a subscriber identifier associated with the remote device identifier.

28. The system of claim 26, wherein the contact profile data store further contains a respective contact address and contact type associated with each of the plurality of contacts.

29. The system of claim 26, wherein the transmitter provides at least one notification message to a contact via a telephone connection.

30. The system of claim 26, wherein the transmitter provides at least one notification message to a contact via an Internet connection.

31. The system of claim 26, wherein the updated notification message is obtained by one of (i) sending an updated location signal at the base station from the remote device and (ii) sending a location request signal to the remote device from the base station.

32. The system of claim 26, wherein the deactivation event is an expiration of a predefined timeout period.

33. The system of claim 26, wherein the deactivation event is a termination by the subscriber.

34. The system of claim 26, further comprising a server, on which resides a website by which the plurality of contacts can retrieve location information via a network connection.

35. One or more computer-readable media having computer-executable instructions for:

testing contact data associated with each of a plurality of contacts, to validate that the contact data for each is valid, the testing comprising at least one of sending a test message and initiating a test call to each of the contacts;

processing an emergency notification, wherein the emergency notification comprises a location signal that represents a current location of a remote device;

determining from a contact profile data store a plurality of contacts for notification of the emergency notification, wherein the contact profile data store contains a contact profile that is associated with the remote device and includes respective contact data relating to each of the plurality of contacts; and communicating information pertaining to the emergency notification to each of the plurality of contacts and to an emergency service, wherein the information comprises a street address determined from the location signal; and obtaining an updated notification message from the remote device, wherein the updated notification message reflects a current location of the device and up-to-date event status information.

36. The one or more computer-readable media of claim 35, wherein the contact profile data store further contains a subscriber identifier associated with the remote device.

37. The one or more computer-readable media of claim 35, wherein the contact profile data store further contain a respective contact address and contact type associated with each of the plurality of contacts.

38. The one or more computer-readable media of claim 35, having further computer-executable instructions for providing the updated notification message to each of the plurality of contacts and to the emergency service until a deactivation event occurs.

39. The one or more computer-readable media of claim 38, wherein the deactivation event is an expiration of a predefined timeout period.

40. The one or more computer-readable media of claim 38, wherein the deactivation event is a termination by a user of the remote device.

41. The one or more computer-readable media of claim 35, further including computer-executable instructions for providing a website by which the plurality of contacts can retrieve location information via a network connection.

* * * * *